United States Patent
Oh et al.

(10) Patent No.: US 10,645,262 B2
(45) Date of Patent: May 5, 2020

(54) CAMERA MODULE

(71) Applicant: Samsung Electro-Mechanics Co., Ltd., Suwon-si (KR)

(72) Inventors: Sung Taek Oh, Suwon-si (KR); Kum Kyung Lee, Suwon-si (KR); Soo Cheol Lim, Suwon-si (KR); Sang Ho Seo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/136,783

(22) Filed: Sep. 20, 2018

(65) Prior Publication Data

US 2019/0141219 A1 May 9, 2019

(30) Foreign Application Priority Data

Nov. 9, 2017 (KR) .......................... 10-2017-0149004

(51) Int. Cl.
*H04N 5/225* (2006.01)
*G02B 7/02* (2006.01)

(52) U.S. Cl.
CPC ............ *H04N 5/2252* (2013.01); *G02B 7/02* (2013.01); *H04N 5/2254* (2013.01); *H04N 5/2257* (2013.01)

(58) Field of Classification Search
CPC .. H04N 5/2251; H04N 5/2252; H04N 5/2254; H04N 5/2257; H04N 5/238; G03B 9/06
See application file for complete search history.

(56) References Cited

U.S. PATENT DOCUMENTS

| | | | |
|---|---|---|---|
| 10,237,458 B2* | 3/2019 | Lim | G02B 7/09 |
| 2011/0122311 A1* | 5/2011 | Han | G03B 9/14 |
| | | | 348/362 |
| 2017/0324892 A1 | 11/2017 | Kim et al. | |
| 2018/0213137 A1* | 7/2018 | Park | H04N 5/238 |
| 2018/0284571 A1* | 10/2018 | Park | G03B 9/02 |
| 2018/0343370 A1* | 11/2018 | Park | H04N 5/2254 |
| 2019/0049692 A1* | 2/2019 | Choi | G02B 7/09 |
| 2019/0137844 A1* | 5/2019 | Park | G03B 9/06 |

FOREIGN PATENT DOCUMENTS

| | | |
|---|---|---|
| JP | 2005-338639 A | 12/2005 |
| KR | 10-2012-0133910 A | 12/2012 |
| KR | 10-2013-0124620 A | 11/2013 |
| KR | 10-1700771 B1 | 1/2017 |

OTHER PUBLICATIONS

Korean Office Action dated Jul. 19, 2019 in corresponding Korean Application No. 10-2017-0149004 (7 pages in English, 5 pages in Korean).

* cited by examiner

*Primary Examiner* — Daniel M Pasiewicz
(74) *Attorney, Agent, or Firm* — NSIP Law

(57) ABSTRACT

A camera module includes a housing accommodating a lens module, and an aperture module coupled to an upper portion of the lens module. The aperture module includes a plurality of plates having an incident hole configured to change an amount of light incident on the lens module. At least one of the plurality of plates is configured to be driven by an interaction between a driving magnet provided in the aperture module and a driving coil provided on the housing opposing the driving magnet in a first direction substantially perpendicular to an optical axis direction.

18 Claims, 17 Drawing Sheets

CAMERA MODULE

CROSS-REFERENCE TO RELATED APPLICATIONS

This application claims the benefit under 35 USC 119(a) of Korean Patent Application No. 10-2017-0149004 filed on Nov. 9, 2017, in the Korean Intellectual Property Office, the entire disclosure of which is incorporated herein by reference for all purposes.

BACKGROUND

1. Field

This application relates to a camera module.

2. Description of the Background

Recently, camera modules have been standardly adopted in portable electronic devices such as tablet PCs, notebooks, and the like, in addition to smartphones. In the case of a digital camera, a mechanical aperture may be provided to change an amount of incident light according to an imaging environment. However, in the case of a camera module used in a small product, such as a portable electronic device, it may be difficult to separately provide an aperture, due to structural features and space securing problems.

For example, due to various components for driving an aperture, the weight of a camera module may be increased. Thus, autofocusing or optical image stabilization functions may be reduced. Moreover, when a power connecting portion such as a coil for driving an aperture is provided in an aperture itself, a problem in which such a power connecting portion is caught by vertical movement of a lens during autofocusing may occur.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing accommodating a lens module and an aperture module coupled to an upper portion of the lens module. The aperture module includes a plurality of plates having an incident hole configured to change an amount of light incident on the lens module. At least one of the plurality of plates is configured to be driven by an interaction between a driving magnet provided in the aperture module and a driving coil provided on the housing opposing the driving magnet in first a direction substantially perpendicular to an optical axis direction.

The aperture module may further include a fixed portion having a base fixed to an upper portion of the lens module, and a protruding portion extended in the optical axis direction along an outer side of the lens module from the base, and a driving portion configured to be moved from the protruding portion in a second direction perpendicular to the optical axis direction.

The driving magnet may be disposed in the driving portion.

The camera module may further include a pulling yoke disposed on a portion of an outer side surface of the lens module opposing the driving magnet in the first direction substantially perpendicular to the optical axis direction.

The pulling yoke may have a length greater than a length of the driving magnet in the second direction, and the pulling yoke may have a middle portion and ends, which each have an area greater than an area of the middle portion.

The camera module may further include a holding yoke disposed in each end of the protruding portion in the second direction.

The camera module may further include at least one ball bearing disposed between the fixed portion and the driving portion.

The at least one ball bearing may include two or more ball bearings and at least two of the ball bearings are spaced apart from each other in the optical axis direction and disposed in each of at least two portions, upwardly and downwardly.

A lower end of the protruding portion may include a protruding bump protruding upwardly in the optical axis direction, and a lower end of the driving portion may include a locking projection protruding downwardly in the optical axis direction to be caught by an inner side of the protruding bump.

The protruding bump and the locking projection may extend in the second direction.

The aperture module may include a cover coupled to an upper portion, and an additional plate, fixedly coupled to the aperture module, may be disposed between the plurality of plates and the cover.

The additional plate may include a passing hole, through which light passes, and the passing hole may have a diameter smaller than a relatively large diameter of a first hole formed by overlapping the plurality of plates in a first arrangement, and may have a diameter larger than a relatively small diameter of a second hole formed by overlapping the plurality of plates in a second arrangement.

The additional plate may be provided in the form of a plate and be antistatic treated.

The base may include a first projecting portion protruding in an optical axis direction, the at least one of the plurality of plates may be fitted to the first projecting portion to be rotated around the first projecting portion as a shaft, the driving portion may include a second projecting portion protruding in the optical axis direction, and the second projecting portion may be disposed in a guide hole having a hole shape elongated in a direction in the at least one of the plurality of plates.

The guide hole may include a first guide hole and a second guide hole disposed in respective plates of the at least one of the plurality of plates, wherein the elongated direction is inclined in the second direction, and the first guide hole and the second guide hole may be inclined with respect to each other.

In another general aspect, a camera module includes a housing accommodating a lens module and an aperture module coupled to an upper portion of the lens module, and including a plurality of plates having an incident hole to change an amount of light incident on the lens module. The housing includes four sides substantially parallel to an optical axis direction, wherein first and second driving coils configured to stabilize an optical image of the lens module, a third driving coil configured to autofocus the lens module, and a fourth driving coil configured to drive at least one of the plurality of plates are disposed on respective sides of the housing.

The aperture module may further include a fixed portion having a base fixed to the upper portion of the lens module, and a protruding portion extended in the optical axis direction along an outer side of the lens module from the base, and a driving portion disposed opposing the fourth driving coil in a first direction substantially perpendicular to an optical axis direction and configured to be moved from the protruding portion in a second direction perpendicular to the optical axis direction to drive the at least one of the plurality of plates.

In another general aspect, a camera module includes a lens module disposed in a housing, and an aperture module. The aperture module includes a fixed portion disposed on the lens module comprising a protruding portion extended in a first direction, a driving magnet, disposed on the protruding portion, and configured to move from the protruding portion in a second direction substantially perpendicular to the first direction, a driving coil disposed on the housing and configured to move the driving magnet, plates disposed on the fixed portion and coupled to the driving magnet, wherein through holes in each of the plates overlap to form an incident hole and change a diameter of the incident hole based on movement of the driving magnet.

The plates may include a first plate and a second plate disposed on a first projecting portion of the fixed portion that are configured to rotate in opposite directions from each other around the first projecting portion as a shaft by movement of the driving magnet to a first end portion of the protruding portion in the second direction and to counter-rotate around the first projecting portion as a shaft by movement of the driving magnet to a second end portion of the protruding portion in the second direction, wherein the first plate and the second plate may each form a portion of an edge of the incident hole having a first diameter by the driving magnet being at the first end portion of the protruding portion and the first plate and the second plate may each form a portion of an edge of the incident hole having a second diameter greater than the first diameter by the driving magnet being at the second end portion of the protruding portion.

The aperture module may further include an additional plate, disposed above the aperture module, and including a passing hole having a third diameter greater than the first diameter and less than the second diameter through which light passes to the incident hole.

Other features and aspects will be apparent from the following detailed description, the drawings, and the claims.

BRIEF DESCRIPTION OF THE DRAWINGS

FIGS. 10A, 10B, and 100 are cross-sectional views of various alternative examples of the aperture module in the examples described herein.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Examples described herein provide a camera module capable of selectively changing an amount of light incident through an aperture module and capable of preventing autofocusing or optical image stabilization functions from being degraded, even when an aperture module is mounted thereon.

The examples described herein also provide a camera module capable of significantly reducing an increase in weight through application of an aperture module.

Herein, it is noted that use of the term "may" with respect to an example, for example, as to what an example may include or implement, means that at least one example exists in which such a feature is included or implemented while all examples are not limited thereto.

A camera module in the examples described herein may be mounted in a portable electronic device, such as a mobile communications terminal, a smart phone, a tablet PC, and the like.

Figure 1:
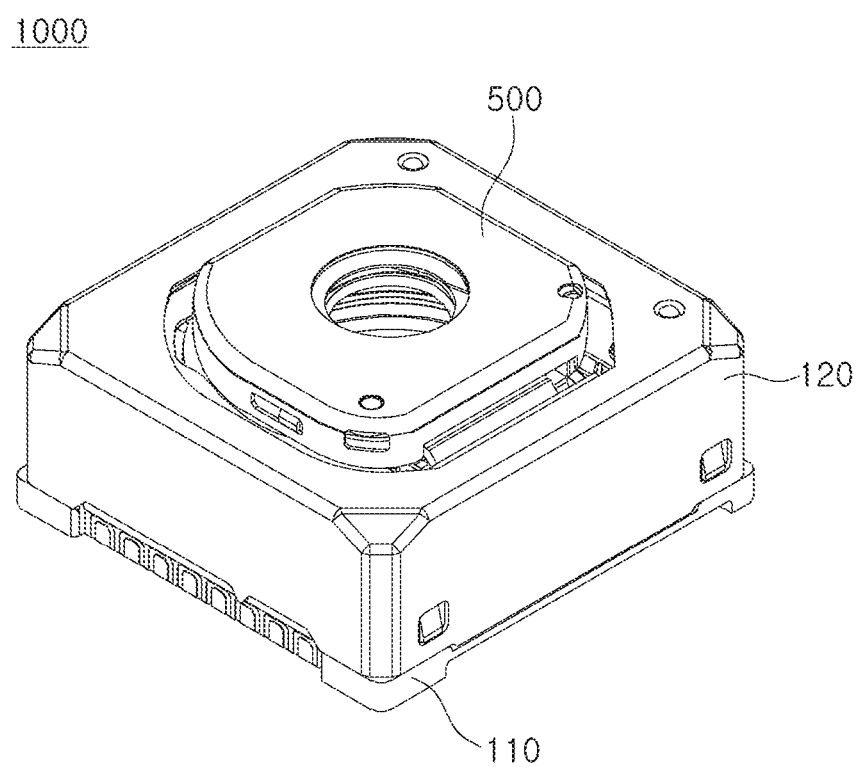
FIG. 1 is a perspective view of an example of a camera module.
Figure 2:
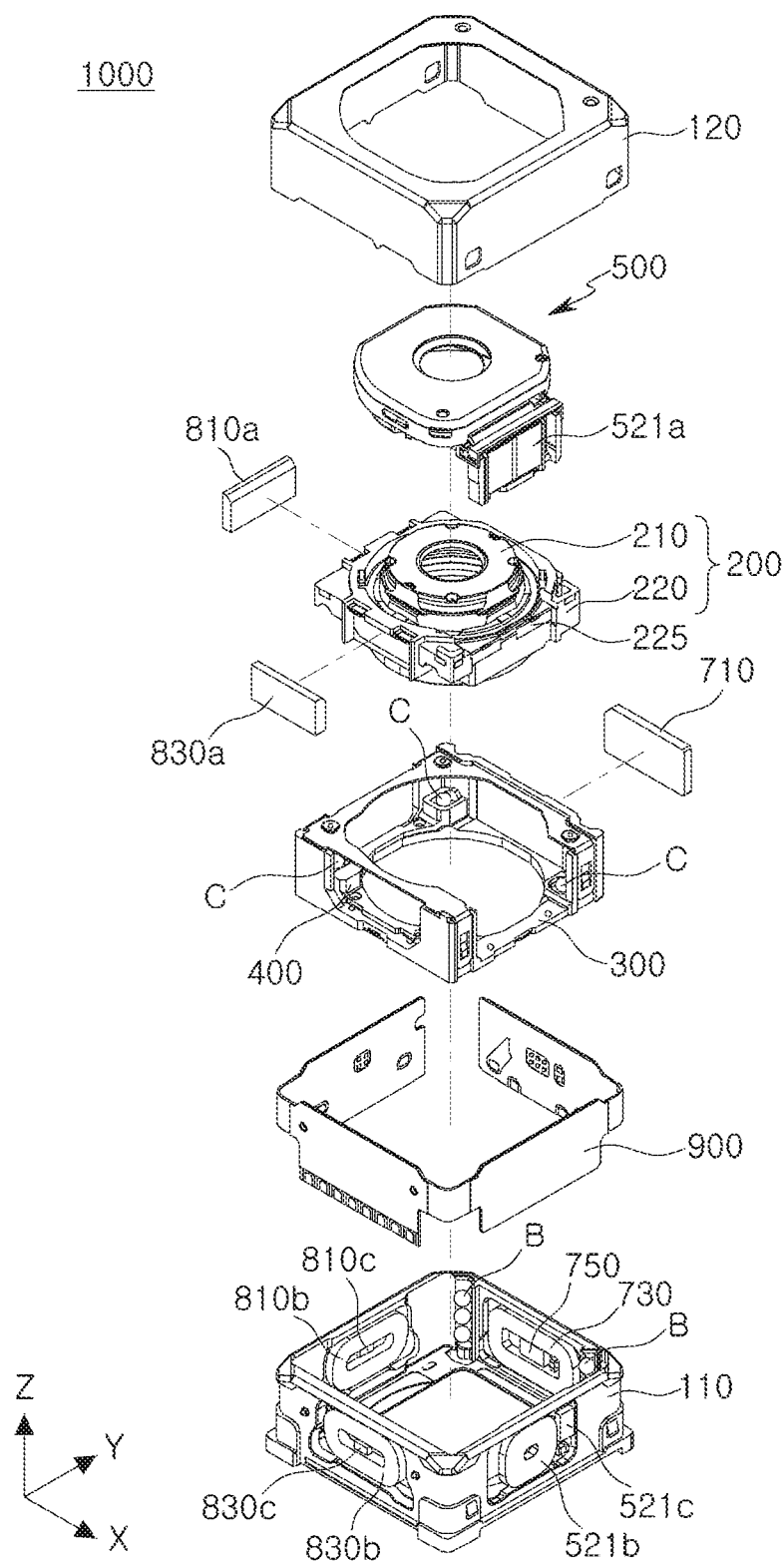
FIG. 2 is an exploded perspective view of the example camera module of FIG. 1.
Figure 3:
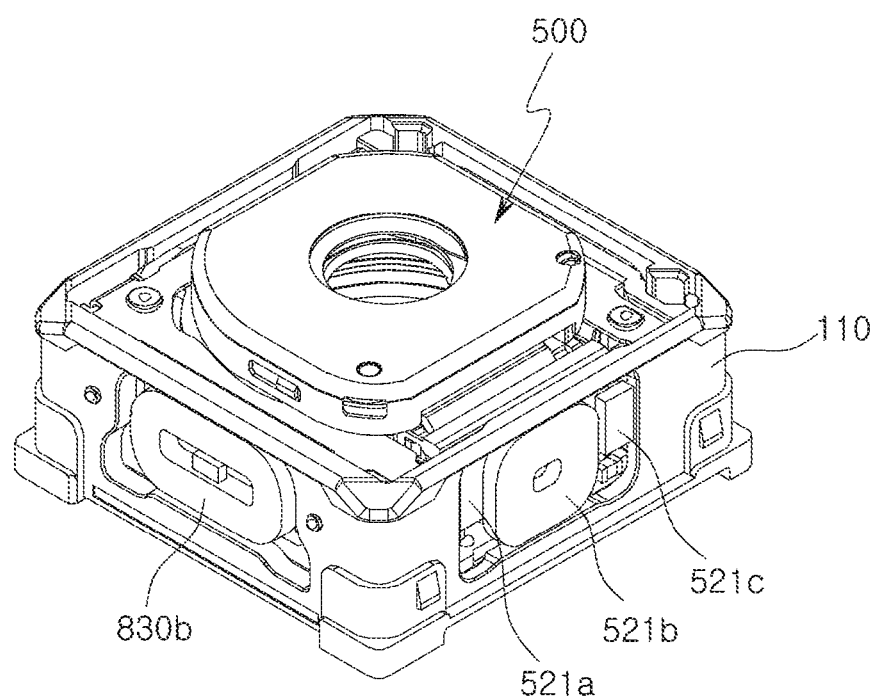
FIG. 3 is a perspective view of a portion of the example camera module of FIG. 1.

FIG. 1 is a perspective view of an example of a camera module, FIG. 2 is an exploded perspective view of the example camera module of FIG. 1, and FIG. 3 is a perspective view of a portion of the example camera module of FIG. 1.

Referring to FIGS. 1 to 3, the camera module 1000 in the present example includes a lens module 200, a carrier 300, a guide portion 400, an aperture module 500, a housing 110, and a case 120.

The lens module 200 may include a lens barrel 210 having a plurality of lenses for imaging a subject, and a barrel holder 220 accommodating the lens barrel 210. The plurality of lenses may be disposed in the lens barrel 210 along an optical axis. The lens module 200 may be accommodated in the carrier 300 to be moved in a direction perpendicular to an optical axis (a Z-axis), for example, in an X-axis direction and a Y-axis direction perpendicular to the optical axis and the X-axis direction.

The lens module 200 is configured to be moved in the optical axis direction for autofocusing. For example, due to an autofocusing portion, the lens module 200 may be moved in the optical axis direction together with the carrier 300.

The autofocusing portion includes a magnet 710, generating driving force in the optical axis direction, and a coil 730. Moreover, a position sensor 750, for example, a Hall sensor, may be provided to sense a position of the lens module 200 in an optical axis direction, that is, to sense a position of the carrier 300 in the optical axis direction.

The magnet 710 may be mounted in the carrier 300. For example, the magnet 710 may be mounted on one side of the carrier 300.

The coil 730 and the position sensor 750 are mounted in the housing 110. For example, the coil 730 and the position sensor 750 may be fixed to the housing 110 to oppose the magnet 710. The coil 730 and the position sensor 750 may be provided in a substrate 900, and the substrate 900 may be mounted on the housing 110.

The magnet 710 is a moving member, mounted on the carrier 300 and moving in the optical axis direction together with the carrier 300, while the coil 730 and the position sensor 750 are fixed members, fixed to the housing 110.

When power is applied to the coil 730, due to the electromagnetic influence between the magnet 710 and the coil 730, the carrier 300 may be moved in the optical axis direction. In addition, the position sensor 750 may sense a position of the carrier 300 in an optical axis direction.

The lens module 200 is accommodated in the carrier 300, so, due to movement of the carrier 300, the lens module 200 is also moved in the optical axis direction, together with the carrier 300.

When the carrier 300 is moved, to reduce friction between the carrier 300 and the housing 110, a rolling member B may be disposed between the carrier 300 and the housing 110. The rolling member B may have a ball shape.

The rolling member B may be disposed on each of both sides of the magnet 710 (or the coil 730).

A yoke may be mounted on the substrate 900. For example, the yoke may be provided to oppose the magnet 710 with the coil 730 interposed therebetween.

Attractive force is applied in a direction perpendicular to the optical axis direction between the yoke and the magnet 710. Thus, due to the attractive force between the yoke and the magnet 710, the rolling member B may maintain a state of contact between the carrier 300 and the housing 110.

Moreover, the yoke may serve to focus a magnetic force of the magnet 710. Thus, occurrence of leakage flux may be prevented.

For example, the yoke and the magnet 710 may form a magnetic circuit.

To correct shaking of an image, caused by factors, such as user hand-shake, and the like, the lens module 200 may be moved in a first direction perpendicular to an optical axis, and a second direction perpendicular to the optical axis and the first direction.

For example, an optical image stabilizing portion may compensate for shake by giving a relative displacement, corresponding to shake, to the lens module 200, when shake occurs during imaging due to user hand-shake.

The guide portion 400 is accommodated in the carrier 300 to be placed upwardly in the optical axis direction. In addition, a barrel holder 220 is placed in an upper portion of the guide portion 400. Moreover, between the carrier 300 and the guide portion 400 in the optical axis direction and between the guide portion 400 and the barrel holder 220 in the optical axis direction, a ball member C, serving as a rolling bearing, may be provided.

When the lens module 200 is moved in the first direction and the second direction, perpendicular to the optical axis, the guide portion 400 is configured to guide the lens module 200.

For example, the lens module 200 may move relatively in the first direction with respect to the guide portion 400, while the guide portion 400 and the lens module 200 may be configured to be moved together in the second direction in the carrier 300.

The optical image stabilizing portion includes a plurality of magnets 810a and 830a generating driving force for optical image stabilization and a plurality of coils 810b and 830b. Moreover, to sense a position of the lens module 200 in the first direction and the second direction, a plurality of position sensors 810c and 830c, for example, a Hall sensor, may be provided.

Among the plurality of magnets 810a and 830a and the plurality of coils 810b and 830b, a portion of magnets, for example, the magnet 810a, and a portion of coils, for example, the coil 810b may be disposed to oppose each other in the first direction to generate driving force in the first direction, while a remaining portion of magnets, for example, the magnet 830a and a remaining portion of coils, for example, the coil 830b may be disposed to oppose each other in the second direction to generate driving force in the second direction.

The plurality of magnets 810a and 830a are mounted in the lens module 200, while the plurality of coils 810b and 830b, opposing the plurality of magnets 810a and 830a, and a plurality of position sensors 810c and 830c are fixed to the housing 110. For example, the plurality of coils 810b and 830b and the plurality of position sensors 810c and 830c are provided in the substrate 900, and the substrate 900 is mounted in the housing 110.

The plurality of magnets 810a and 830a are moving members, moved in the first direction and the second direction, together with the lens module 200, while the plurality of coils 810b and 830b and the plurality of position sensors 810c and 830c are fixed members, fixed to the housing 110.

In an example, a ball member C, supporting the guide portion 400 and the lens module 200, is provided. The ball member C serves to guide the guide portion 400 and the lens module 200 during a process of optical image stabilization.

The ball member C may be provided between the carrier 300 and the guide portion 400, between the carrier 300 and the lens module 200, and between the guide portion 400 and the lens module 200.

When driving force is generated in the first direction, the ball member C, disposed between the carrier 300 and the guide portion 400, and between the carrier 300 and the lens module 200, may move in a rolling motion in the first direction. Thus, the ball member C may guide movement of the guide portion 400 and the lens module 200 in the first direction.

In addition, when driving force is generated in the second direction, the ball member C, disposed between the guide portion 400 and the lens module 200, and between the carrier 300 and the lens module 200, may move in a rolling motion in the second direction. Thus, the ball member C may guide movement of the lens module 200 in the second direction.

The lens module 200 and the carrier 300 are accommodated in the housing 110. For example, the housing 110 has a shape in which a top and a bottom are open, and the lens module 200 and the carrier 300 are accommodated in an internal space of the housing 110.

A printed circuit board (not shown) on which an image sensor is mounted may be disposed in a lower portion of the housing 110.

The case 120 may be coupled to the housing 110 to surround an external surface of the housing 110, and may serve to protect an internal component of the camera module 1000. Moreover, the case 120 may serve to shield electromagnetic waves.

For example, to prevent the electromagnetic waves, generated from the camera module 1000, from affecting other electronic components in a portable electronic device, the case 120 may shield electromagnetic waves.

Moreover, as the portable electronic device is equipped with various electronic components other than the camera module 1000, the case 120 may shield electromagnetic waves, such that electromagnetic waves, generated by the electronic components, do not affect the camera module 1000.

The case 120 is formed of a material such as a metal, and thus may be grounded to a ground pad provided in a printed circuit board, thereby shielding electromagnetic waves.

The aperture module 500 is a device configured to selectively change an amount of light incident on the lens module 200.

Figure 4:
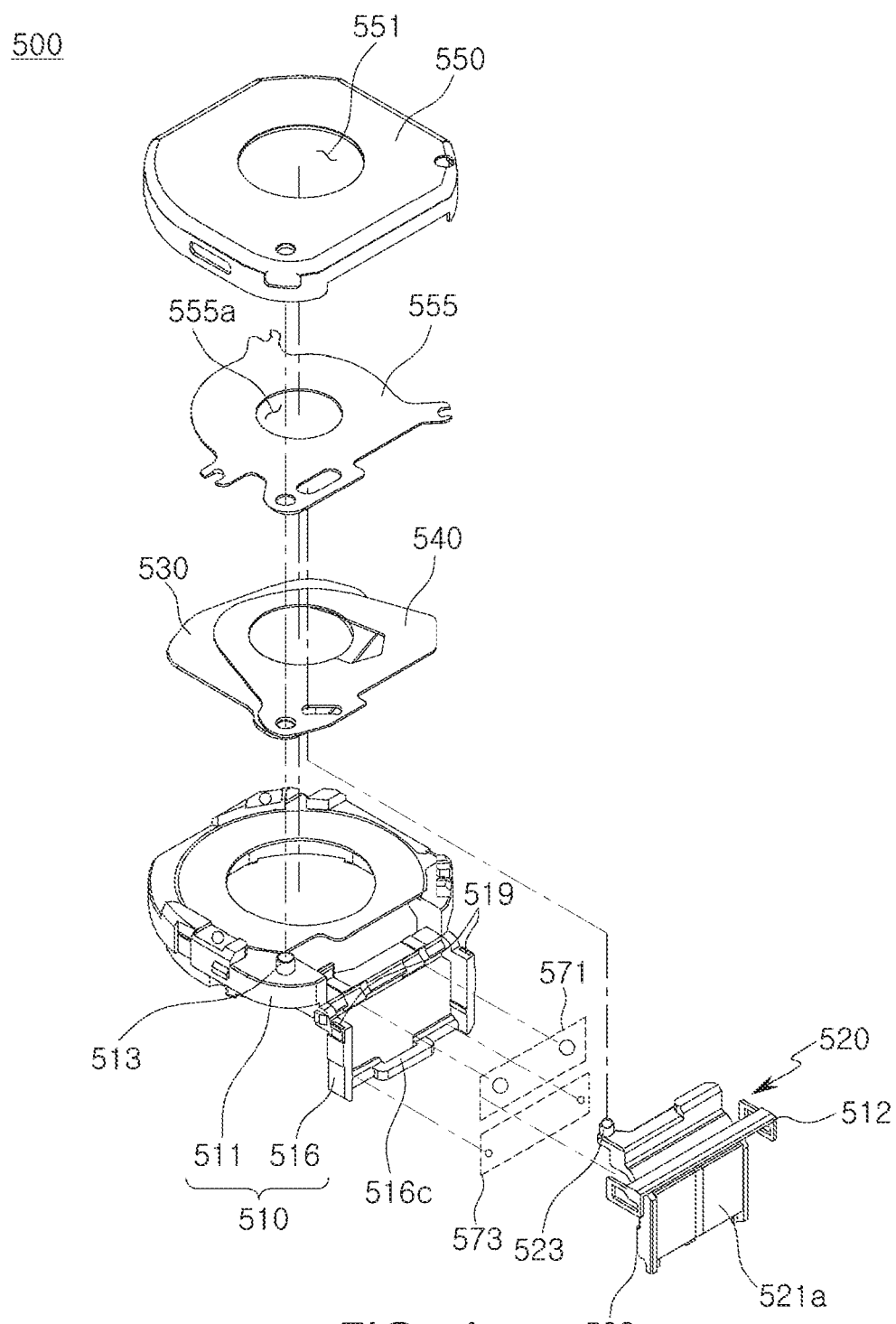
FIG. 4 is an exploded perspective view of an example of an aperture module in the portion of the camera module of FIG. 3.

For example, referring to FIG. 4, in the example of an aperture module 500 shown in FIGS. 1-3, plates 530 and 540, having a plurality of incident holes with different sizes, may be provided as a plurality of plates, for example, at least two plates. Depending on the imaging environment, light may be incident through one, among a plurality of incident holes with different sizes, formed by the plates 530 and 540.

As described previously, the camera module 1000 in the examples disclosed herein, includes the housing 110 accommodating the lens module 200 and having a substantially rectangular box shape. Moreover, the aperture module 500, coupled to an upper portion of the lens module 200, and including plates 530 and 540 having incident holes with different diameters to change an amount of light incident on the lens module 200, may be provided.

Thus, four sides of the housing 110, parallel to an optical axis direction, are provided with two driving coils 810b and 830b for optical image stabilization, a driving coil 730 for autofocusing, and a driving coil 521b of the driving portion 520 of the aperture module 200, respectively.

Figure 5A:
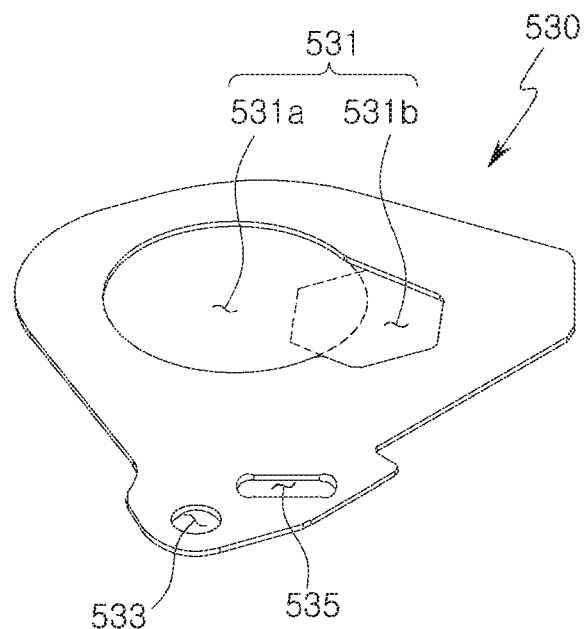
FIG. 5A is a perspective view of an example of a first plate provided in the aperture module of FIG. 4.
Figure 5B:
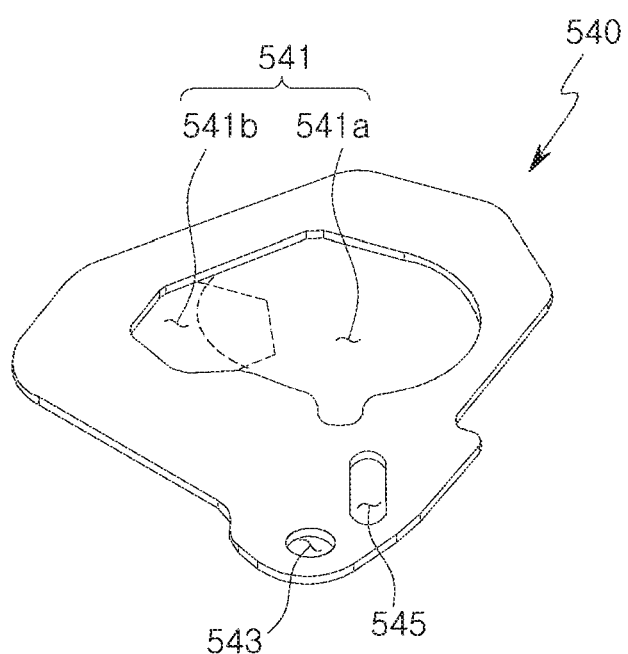
FIG. 5B is a perspective view of an example of a second plate provided in the aperture module of FIG. 4.
Figure 6A:
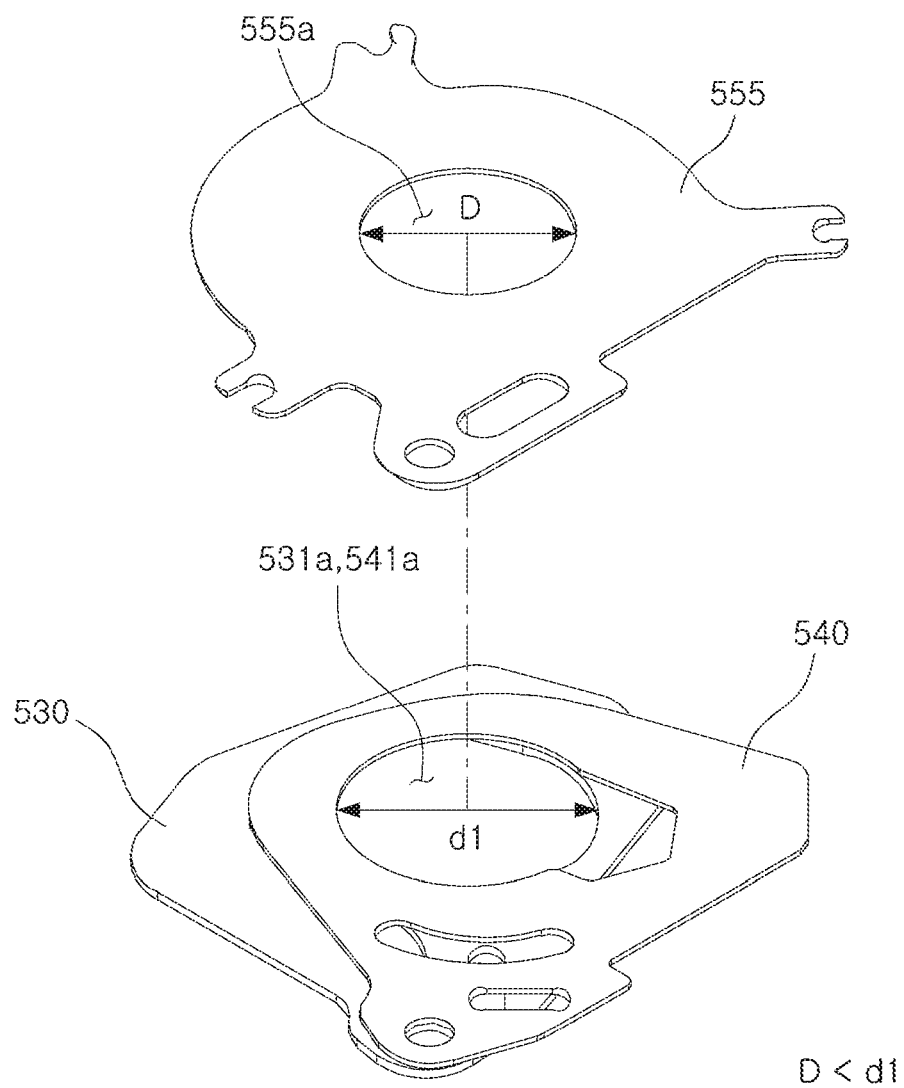
FIGS. 6A and 6B are reference views illustrating example arrangements in which the first plate, the second plate, and a third plate are disposed to overlap each other in the examples described herein.
Figure 6B:
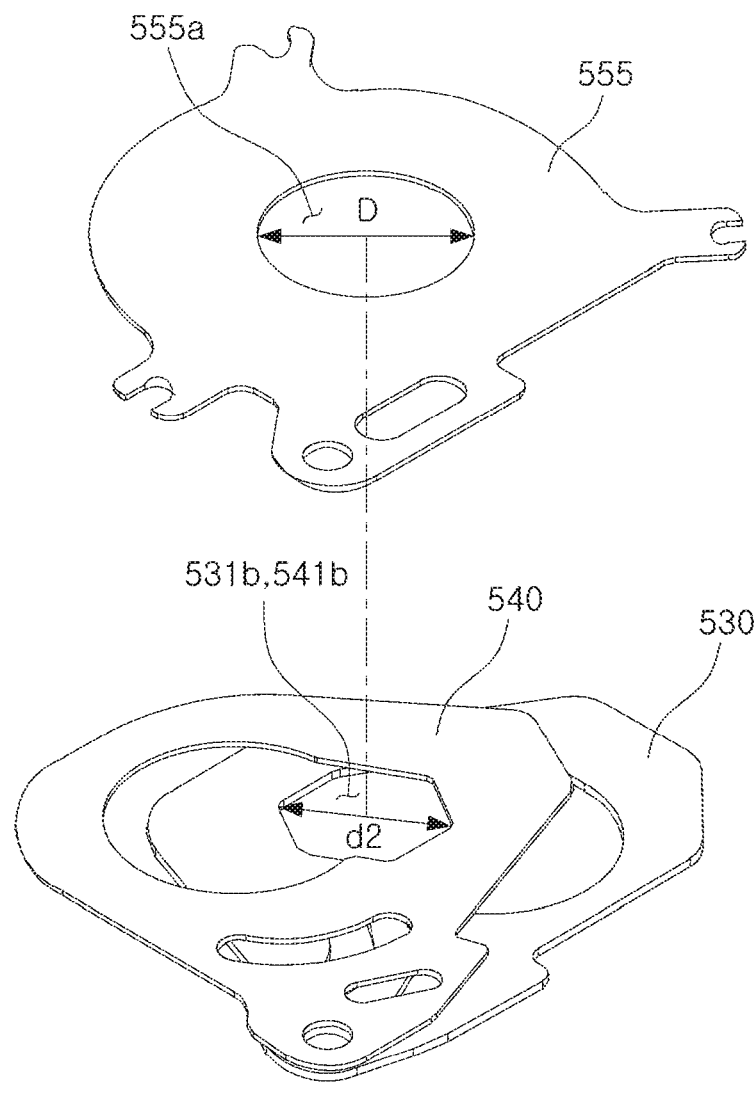
Figure 7A:
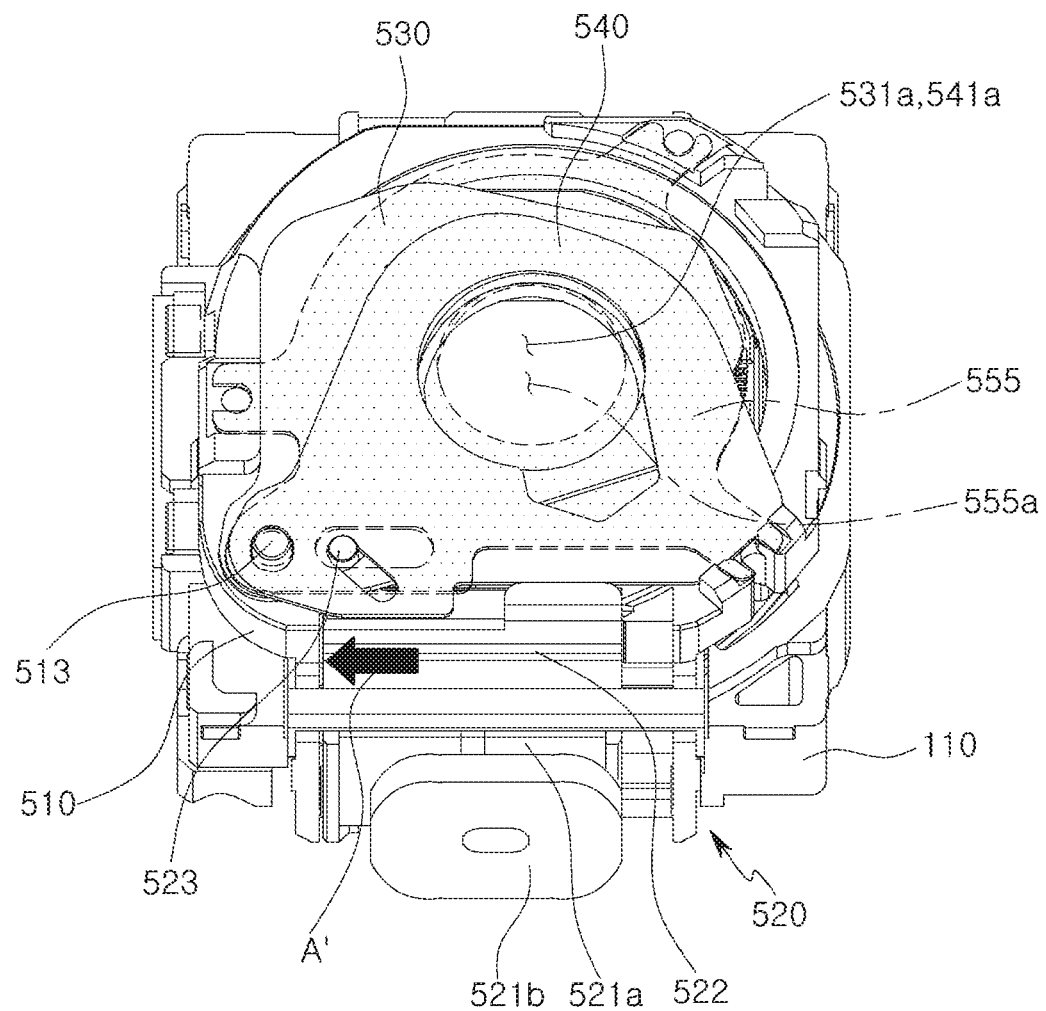
FIGS. 7A and 7B are top perspective views of a portion of the example aperture of FIG. 4 illustrating an example of a state in which an aperture module is driven to change a diameter of an incident hole in the examples described herein.
Figure 7B:
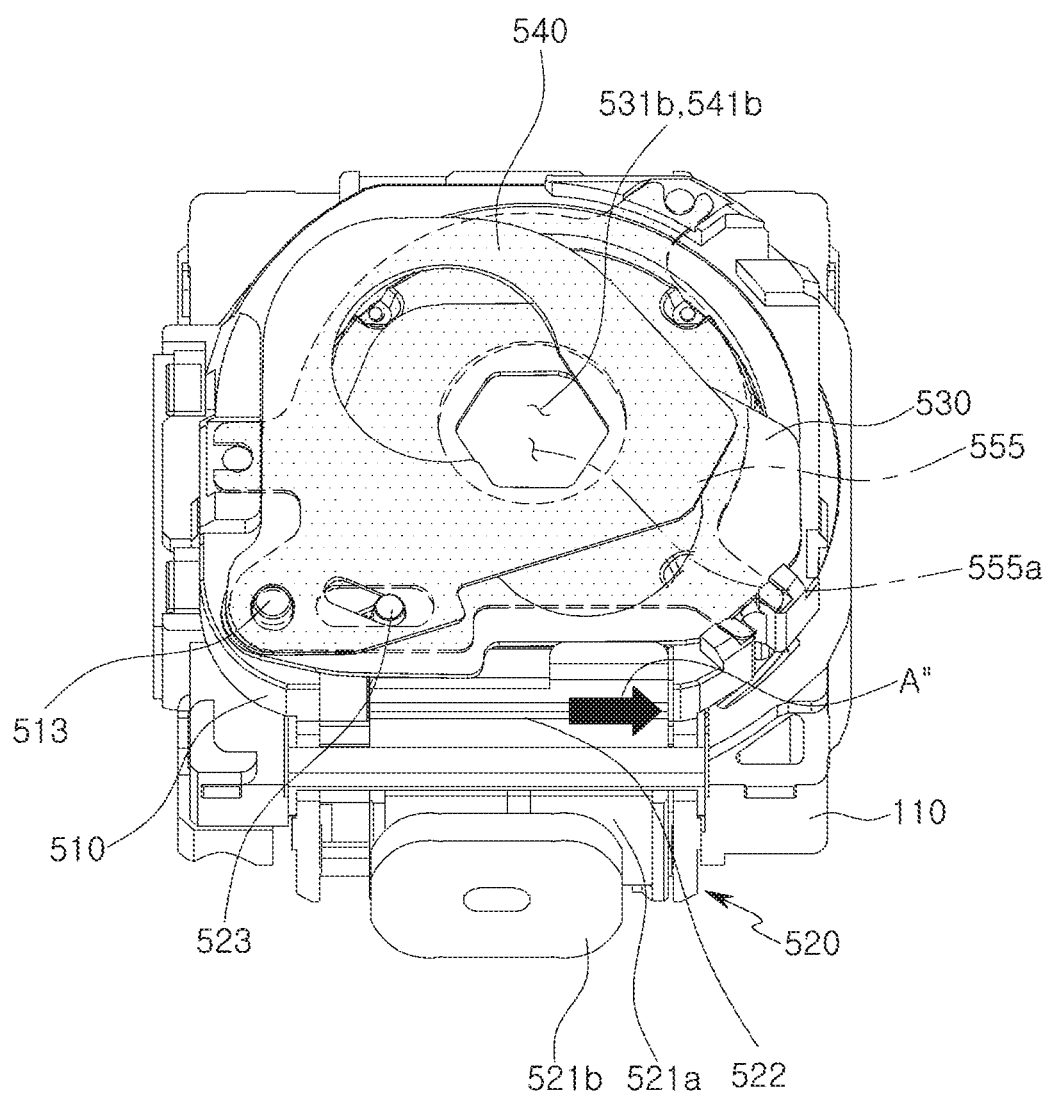
Figure 8:
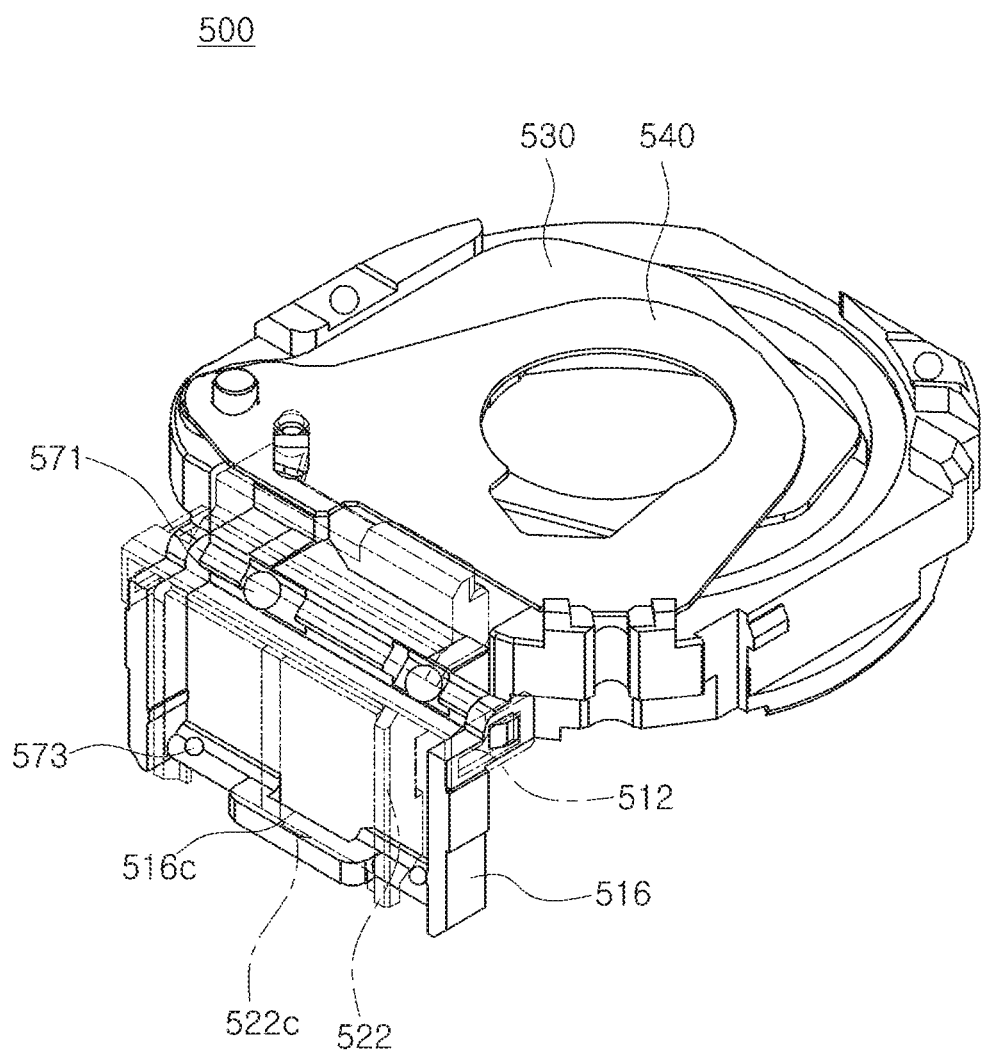
FIG. 8 is a perspective view of a portion of the example aperture module of FIG. 4.
Figure 9:
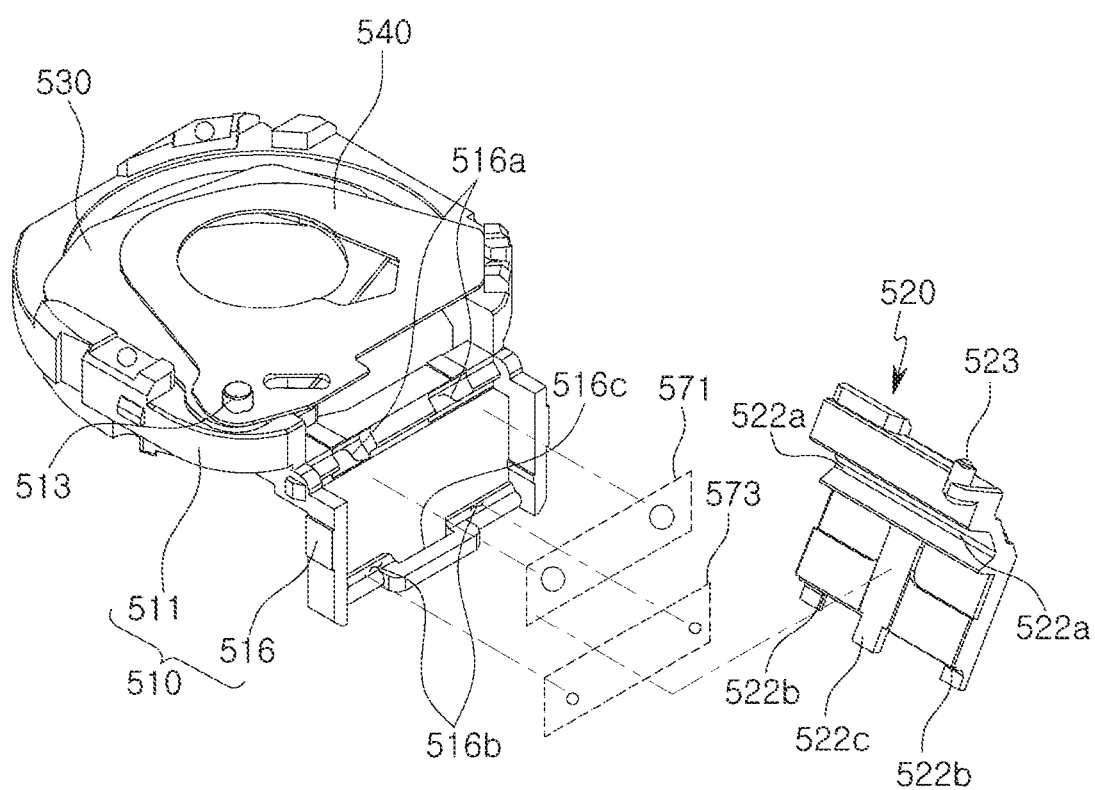
FIG. 9 is an exploded perspective view of an example of a fixed portion and a driving portion of the aperture module of FIG. 4.

FIG. 4 is an exploded perspective view of an example aperture module in the portion of the camera module of FIG. 3, FIG. 5A is a perspective view of an example of a first plate provided in the aperture module of FIG. 4, FIG. 5B is a perspective view of an example of a second plate provided in the aperture module of FIG. 4, FIGS. 6A and 6B are reference views illustrating example arrangements in which the first plate, the second plate, and a third plate are disposed to overlap each other in the examples described herein, FIGS. 7A and 7B are top perspective views of a portion of the example aperture of FIG. 4 illustrating an example of a state in which an aperture module is driven to change a diameter of an incident hole in the examples described herein, FIG. 8 is a perspective view of a portion of the example of an aperture module of FIG. 4, and FIG. 9 is an exploded perspective view of an example of a fixed portion and a driving portion of the aperture module of FIG. 4.

The aperture module 500 is coupled to an upper portion of the lens module 200, and may be configured to selectively change an amount of light incident on the lens module 200.

In a high light level environment, a relatively small amount of light is allowed to be incident on the lens module 200 by the aperture module 500. In a low light level environment, a relatively large amount of light is allowed to be incident on the lens module 200 by the aperture module 500. Thus, even in various illumination conditions, a quality of an image may be kept constant.

The aperture module 500 is configured to be coupled to the lens module 200 to be moved in the optical axis direction, the first direction, and the second direction together with the lens module 200. In other words, during autofocusing and optical image stabilization, the lens module 200 and the aperture module 500 are allowed to be moved together, so that a distance therebetween is not changed.

Referring to FIG. 4, the aperture module 500 includes a fixed portion 510, including a base 511 fixed to an upper portion of the lens module 200 and a protruding portion 516 extended from the base 511 along an outer side of the lens module 200 in an optical axis direction, and a driving portion 520 provided to be moved in the protruding portion 516 in a direction perpendicular to the optical axis direction. In other words, the fixed portion 510, fixed to an upper portion of the lens module 200, and the driving portion 520, movably supported by the fixed portion 510, are included in the aperture module 500.

In addition, in order to adjust a size of incident holes 531 and 541 due to movement of the driving portion 520, a first plate 530, a second plate 540, and an aperture driving portion, for example, a driving magnet 521a and a driving coil 521b, are included in the aperture module 500. Moreover, a position sensor 521c, for example, a Hall sensor, sensing a position of the driving portion 520 may be provided on the housing 110, for example, the position sensor 521c may be disposed on the substrate 900 coupled to the housing 110.

Moreover, a cover 550, covering the fixed portion 510, the first plate 530, and the second plate 540, and having a through hole 551 on which light is incident, may be included.

In the examples of the aperture module 500 described herein, a third plate 555, fixedly coupled to the base 511 of the fixed portion 510, may be provided between the plurality of plates 530 and 540 and the cover 550. The third plate 555 may be fixedly coupled to a rotating shaft, to which the plurality of plates 530 and 540 are fitted, a groove of the base 511, or an upper surface of the base 511, or the like.

A distance between the plates 530 and 540 and the cover 550 may be maintained due to the third plate 555, and static electricity, and the like, may be prevented from occurring. The third plate 555 may be provided in the form of a plate, and may be antistatic treated. The plurality of plates 530 and 540 are antistatic treated, and may be used as an antistatic member. The third plate 555 may include a material the same as a material of the plates 530 and 540. The third plate 555 may be in contact with the second plate 540, located thereabove, when the plates 530 and 540 move.

Moreover, the third plate 555 is provided with the passing hole 555a, through which light passes, and light, incident through the through hole 551 of the cover 550, may pass therethrough.

In an alternative example of an aperture module 500, a third plate 555 may not be separately provided. In this case, a separate member for maintaining a distance between the plates 530 and 540 and the cover 550 may be provided, or an inner side surface of the cover 550 may be antistatic treated.

Referring to FIGS. 5A and 5B, the first plate 530 is provided with the first incident hole 531, and the second plate 540 is provided with the second incident hole 541.

In addition, the first plate 530 is provided with the first guide hole 533 and the third guide hole 535, while the second plate 540 is provided with the second guide hole 543 and the fourth guide hole 545.

The first guide hole 533 and the second guide hole 543 are provided to have a circular shape, and the third guide hole 535 and the fourth guide hole 545 may be provided each having a shape elongated in a direction to be inclined with respect to each other. Moreover, inclined directions of the third guide hole 535 and the fourth guide hole 545 may be opposite to each other.

The first incident hole 531 and the second incident hole 541 may have a shape in which a plurality of through holes 531a, 531b, 541a, and 541b with different diameters are connected to each other. The first incident hole 531 may have a shape in which through hole 531a with a relatively large diameter and through hole 531b with a relatively small diameter are connected to each other. The second incident hole 541 may have a shape in which through hole 541a with a relatively large diameter and through hole 541b with a relatively small diameter are connected to each other. For example, the first incident hole 531 may have an overall gourd (or a roly poly toy) shape, while the through holes 531a and 531b, may each have a rounded, distorted and rounded, or polygonal shape. The second incident hole 541 may have an overall gourd (or a roly poly toy) shape, while the through holes 541a and 541b, may each have a rounded, distorted and rounded, or polygonal shape.

Moreover, shapes of the first incident hole 531 and the second incident hole 541 may be opposite to each other. In other words, the first plate 530 and the second plate 540 may move around a first projecting portion 513 as a central axis in a rotating motion, while the first guide hole 533 and the second guide hole 543 are fitted to the first projecting portion 513. In consideration of this, the first incident hole 531 and the second incident hole 541 may be provided to have approximately symmetrical shapes in a circumferential direction.

The first plate 530 and the second plate 540 are coupled to the base 511 to allow portions thereof to overlap each other in an optical axis direction, and may be configured to be moved by an aperture driving portion. For example, the first plate 530 and the second plate 540 may be configured to move in a rotating motion in opposite directions depending on movement of the driving portion 520.

Moreover, portions of the first incident hole 531 and the second incident hole 541 may be configured to overlap each other in an optical axis direction. The portions of the first incident hole 531 and the second incident hole 541 overlap each other in the optical axis direction, thereby forming an incident hole through which light passes.

The portions of the first incident hole 531 and the second incident hole 541 overlap each other, thereby forming a plurality of incident holes having different diameters. For example, considering that the first incident hole 531 and the second incident hole 541 are formed to have a gourd (a roly poly toy) shape, respective portions of the first incident hole 531 (531a) and the second incident hole 541 (541a) having a larger diameter overlap each other to form an incident hole having a relatively large diameter d1 (FIGS. 6A and 7A), and respective portions having a smaller diameter of the first incident hole 531 (531b) and the second incident hole 541 (541b) overlap each other to form an incident hole having a relatively small diameter d2 (FIGS. 6B and 7B). In the present examples, the respective incident holes 531a, 541a and 531b, 541b may have a rounded or polygonal shape depending on a shape of the first incident hole 531 and the second incident hole 541.

Thus, depending on the imaging environment, through one among a plurality of incident holes with different sizes, light may be allowed to be incident.

The third plate 555, fixed to the base 511 and not rotating, may be provided above the first plate 530 and the second plate 540. In addition, the third plate 555 is provided with a passing hole 555a.

The passing hole 555a, provided in the third plate 555, may be formed to be larger than a hole (D>d2), formed by overlapping through holes 531b and 541b, having a smaller diameter, among incident holes 531 and 541 of the first plate 530 and the second plate 540, and may be formed to be smaller than a hole (D<d1), formed by overlapping through holes 531a and 541a, having a larger diameter (FIGS. 6A, 6B, 7A, and 7B).

Thus, when the first plate 530 and the second plate 540 move and through holes 531b and 541b having smaller diameters overlap each other to form a hole, a size of the passing hole 555a is larger, so a maximum diameter in which light passes through holes 531b and 541b formed by overlapping the first plate 530 and the second plate 540 may be provided. When the first plate 530 and the second plate 540 move and through holes 531a and 541a having larger diameters overlap each other to form a hole, a size of the passing hole 555a is smaller, so a maximum diameter in which light passes through the passing hole 555a of the third plate 555 may be provided. In the case of the latter, the passing hole 555a may serve as an aperture (FIGS. 6B and 7B).

Referring to FIG. 7A, when the driving portion 520 moves relatively with respect to the fixed portion 510 in one direction A', and the first plate 530 and the second plate 540 move in a rotating motion around the first projecting portion 513 as a shaft, portions of the first incident hole 531 and the second incident hole 541, that is, through holes 531a and 541a having larger diameters overlap each other, so an incident hole having a relatively large diameter may be provided. Moreover, a size of a passing hole 555a of the third plate 555 (shown in dashed lines) provided above the first plate 530 and the second plate 540 is smaller than a size of a hole formed by overlapping the first plate 530 and the second plate 540. In this case, the passing hole 555a of the third plate 555 may serve as an aperture.

Referring to FIG. 7B, when the driving portion 520 moves relatively with respect to the fixed portion 510 in the opposite direction A" of the one direction A' and the first plate 530 and the second plate 540 move in a rotating motion around the first projecting portion 513 as a shaft, portions of the first incident hole 531 and the second incident hole 541, that is, through holes 531b and 541b having smaller diameters overlap each other, so that an incident hole having a relatively small diameter may be provided.

Referring to FIGS. 8 to 10A and 11A, the aperture driving portion includes the driving portion 520 supported by the fixed portion 510. For example, the fixed portion 510 includes a protruding portion 516 extending in an optical axis direction, and the driving portion 520 includes a holder 522 disposed on the protruding portion 516 to be moved in a direction perpendicular to the optical axis direction along one axis, and having a driving magnet 521a, and a driving coil 521b provided in the housing 110 to oppose the driving magnet 521a. Due to an electromagnetic interaction between the driving magnet 521a and the driving coil 521b, the driving portion 520 in which the driving magnet 521a is fixedly mounted may move in the direction perpendicular to the optical axis direction.

The driving coil 521b may be provided in the substrate 900 (FIG. 2), and the substrate 900 may be fixed to the housing 110. The substrate 900 may be electrically connected to a printed circuit board (not shown) attached to a bottom of the camera module 1000.

The driving portion 520 is a moving member moving in an optical axis direction, a first direction, and a second direction together with the fixed portion 510, while the driving coil 521b is a fixed member fixed to the housing 110.

The driving coil 521b, providing driving force to the aperture module 500, is disposed external to an outer side of the aperture module 500, that is, in the housing 110 of the camera module, thereby reducing the weight of an overall aperture module 500.

In other words, the driving coil 521b, providing driving force to the aperture module 500, is provided as a fixed member, so the driving coil 521b does not move during autofocusing or optical image stabilization driving. Thus, an increase in weight of the lens module 200 due to application of the aperture module 500 may be significantly reduced.

Moreover, the driving coil 521b, providing driving force to the aperture module 500, is disposed in the housing 110, a fixed member. Even when the lens module 200 and the aperture module 500 move during autofocusing and optical image stabilization, the driving coil 521b of the aperture driving portion is not affected. Thus, an auto focusing function may be prevented from being degraded.

The fixed portion 510 is provided with the protruding portion 516 and a crossbar portion 512 in which the driving portion 520 is disposed. The protruding portion 516 may have a shape extended from the base 511 fixed to an upper portion of the lens module 200 in the optical axis direction.

The driving portion 520 includes a driving magnet 521a disposed to oppose the driving coil 521b and a holder 522 to which the driving magnet 521a is attached. The driving portion 520 is closely attached to the protruding portion 516 of the fixed portion 510.

Moreover, in the barrel holder 220 of the lens module 200, a pulling yoke 225 may be provided in a position opposing the driving portion 520. Due to the attractive force between the pulling yoke 225 and the driving magnet 521a, the driving portion 520 may move in a sliding motion while the driving portion is closely attached to the protruding portion 516. Although not illustrated, the pulling yoke 225 may be provided in the fixed portion 510. For example, the pulling yoke may be provided in the base 511 or the protruding portion 516 of the fixed portion 510.

Moreover, as illustrated in FIG. 2, the pulling yoke 225 may be provided at both ends with an area larger than an area of a middle portion, for example, the pulling yoke 225 may even be provided as two separate members spaced apart from each other at regular intervals in a direction perpendicular to an optical axis direction.

Moreover, as illustrated in FIG. 7A, when the driving portion 520 is moved to a left side, the attractive force acting between the driving magnet 521a and a left side of the pulling yoke 225 may be greater than the attractive force acting between the driving magnet 521a and a right side of the pulling yoke 225, so the driving portion 520 may be fixed to the left side.

In addition, as illustrated in FIG. 7B, when the driving portion 520 is moved to a right side, the attractive force acting between the driving magnet 521a and a right side of the pulling yoke 225 may be greater than the attractive force acting between the driving magnet 521a and a left side of the pulling yoke 225, so the driving portion 520 may be fixed to the right side.

To allow the driving portion 520 to move easily, ball bearings 571 and 573 may be provided between the protruding portion 516 and the driving portion 520. A first ball bearing 571 and a second ball bearing 573 may be spaced apart from each other in an optical axis direction and at least one may be provided upwardly or downwardly in each of at least two portions. For example, the first ball bearing 571 and the second ball bearing 573 may be provided as two ball bearings 571 upwardly in an optical axis direction and two ball bearings 573 downwardly in the optical axis direction as illustrated in FIGS. 8 and 9.

Moreover, in the protruding portion 516 and the driving portion 520, first to fourth guide grooves, into which the first ball bearing 571 and the second ball bearing 573 are inserted, may be provided. In detail, in the protruding portion 516, a first guide groove 516a may be provided in each of left and right sides to allow the first ball bearing 571 upwardly in the optical axis direction to be inserted thereinto, and a second guide groove 516b may be provided in each of left and right sides to allow the second ball bearing 573 downwardly in the optical axis direction to be inserted thereinto. Moreover, in the holder 522 of the driving portion 520, a third guide groove 522a may be provided to allow the first ball bearing 571 upwardly in the optical axis direction to be inserted thereinto, and a fourth guide groove 522b may be provided to allow the second ball bearing 573 downwardly in the optical axis direction to be inserted thereinto. Here, the first to fourth guide grooves 516a, 516b, 522a, and 522b may be grooves in the lead-in form, provided in a member. However, if the first to fourth guide grooves 516a, 516b, 522a, and 522b are a space restraining a ball bearing to be moved in a rolling motion, the first to fourth guide grooves 516a, 516b, 522a, and 522b may not have a groove shape.

Even when the driving portion 520, for example, the holder 522, is tightly supported on the protruding portion 516 by the pulling yoke 225, the holder 522 and the protruding portion 516 may be spaced apart from each other by external force. Thus, a problem in which ball bearings 571 and 573, for example, the second ball bearing 573 in a lower portion, may be separated from either the holder 522 or the protruding portion 516 or both the holder 522 and the protruding portion 516, may occur.

Figure 10A:
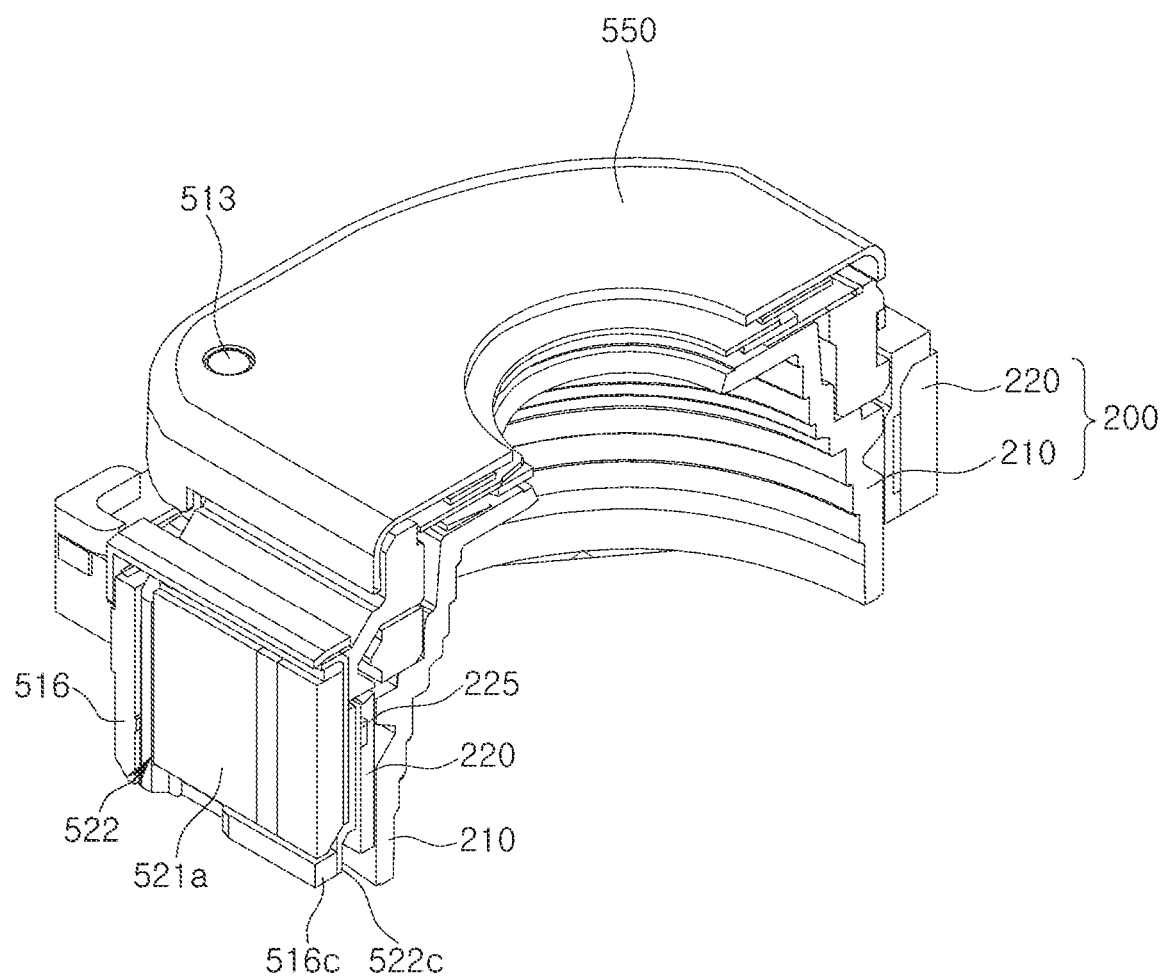

Here, referring to FIG. 10A, in an example, to prevent the driving portion 520 from being separated from the protruding portion 516, a device, allowing the driving portion 520 to be continuously in close contact with the protruding portion 516, may be provided. In other words, a lower end of the protruding portion 516 is provided with a protruding bump 516c protruding upwardly in the optical axis direction, while a lower end of the driving portion 520 is provided with a locking projection 522c protruding downwardly in the optical axis direction to be caught by an inner side of the protruding bump 516c. Due to the structure described above, the locking projection 522c is caught by the protruding bump 516c, and thus may not be spaced apart externally. Thus, the protruding portion 516 may be in close contact with the driving portion 520, so the ball bearings 571 and 573 may not be separated externally.

Moreover, the protruding bump 516c and the locking projection 522c are provided to be extended in a direction perpendicular to an optical axis direction, a direction in which the driving portion 520 moves, and may serve to guide movement of the driving portion 520.

The fixed portion 510, for example, the base 511 may be provided with the first projecting portion 513 simultaneously passing through the first guide hole 533 of the first plate 530 and the second guide hole 543 of the second plate 540. Moreover, the first plate 530 and the second plate 540 move in a rotating motion around the first projecting portion 513 as a shaft.

Moreover, the holder 522 is provided with a second projecting portion 523 extending through the first plate 530 and the second plate 540.

The second projecting portion 523 may be configured to pass through the third guide hole 535 of the first plate 530 and the fourth guide hole 545 of the second plate 540.

The third guide hole 535 and the fourth guide hole 545 may be elongated to be inclined in a direction of movement of the driving portion 520. In addition, inclined directions of the third guide hole 535 and the fourth guide hole 545 may be opposite to each other.

Thus, when the driving portion 520 moves along one axis, the second projecting portion 523 may move in the third guide hole 535 and the fourth guide hole 545. According to movement of the second projecting portion 523, the first plate 530 and the second plate 540 rotate around the first projecting portion 513 as a shaft, and thus may move toward the driving portion 520 or may move away from the driving portion 520 (FIGS. 7A and 7B). For example, in FIG. 7A, the holder 522 has moved to the left as indicated by arrow A', the first plate 530 has rotated around the first projecting portion 513 away from the driving portion 520 according to movement of the second projecting portion 523 in the third guide hole 535, and the second plate 540 has rotated around the first projecting portion 513 toward the driving portion 520 according to movement of the second projecting portion 523 in the fourth guide hole 545. For example, in FIG. 7B, the holder 522 has moved to the right as indicated by arrow A'', the first plate 530 has rotated around the first projecting portion 513 toward the driving portion 520 according to movement of the second projecting portion 523 in the third guide hole 535, and the second plate 540 has rotated around the first projecting portion 513 away from the driving portion 520 according to movement of the second projecting portion 523 in the fourth guide hole 545.

Figure 10B:
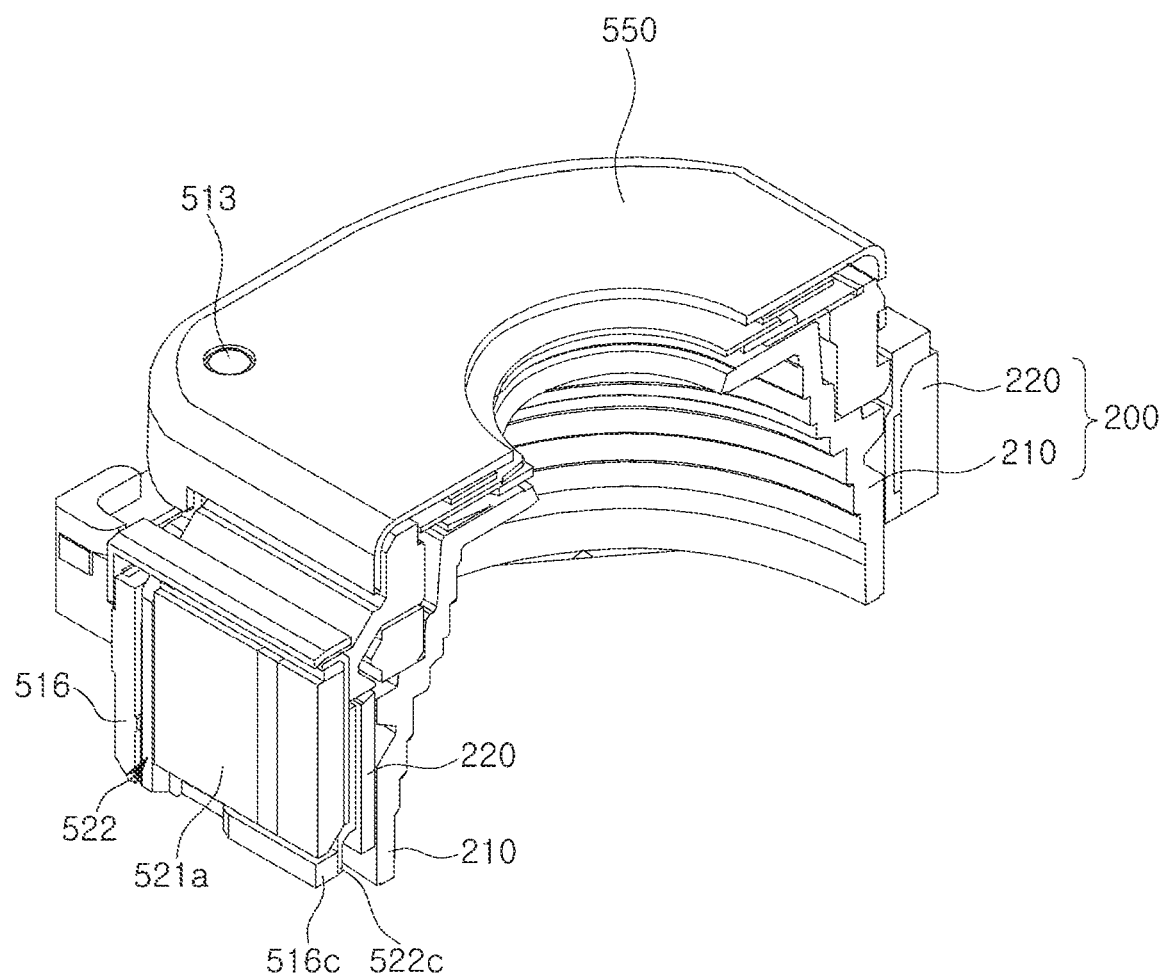
Figure 10C:
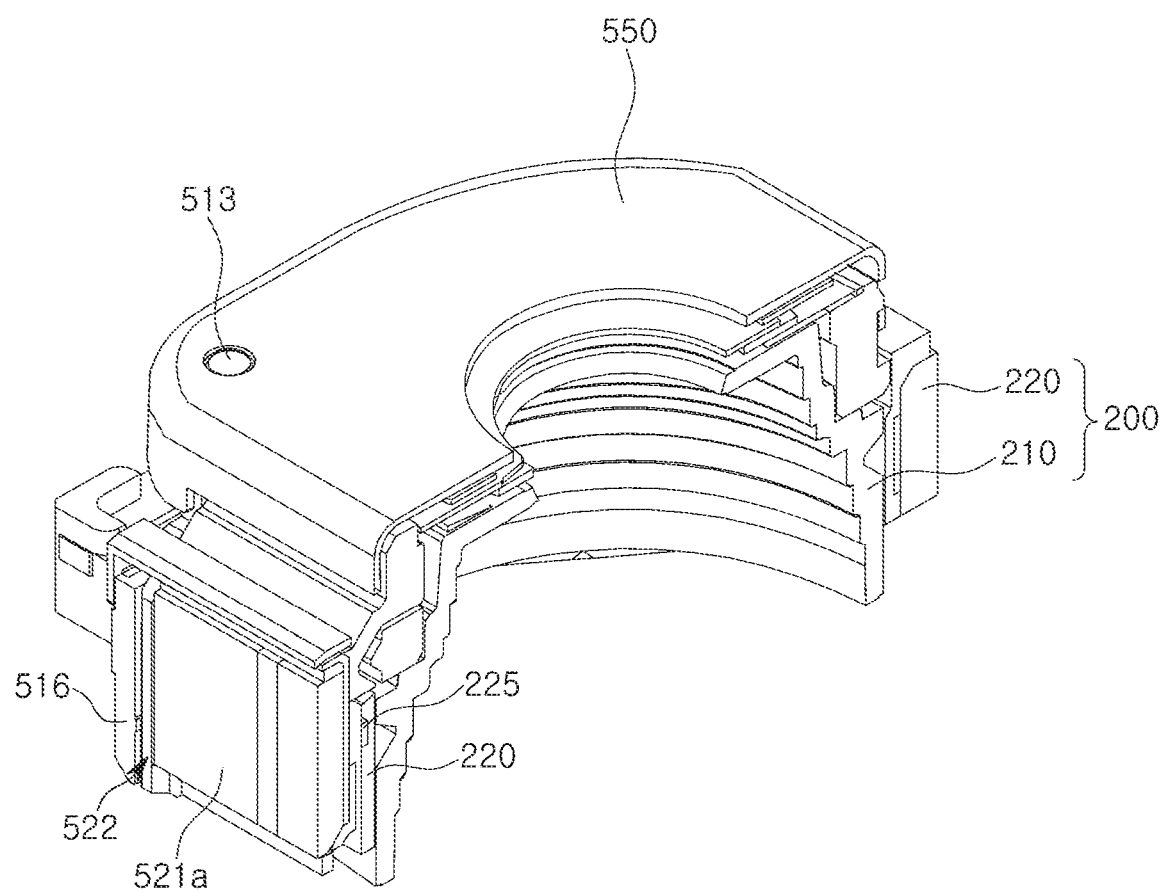

FIGS. 10A, 10B, and 10O are cross-sectional views of various alternative examples of the aperture module in the examples described herein.

As described previously, according to an example illustrated in FIG. 10A, due to the attractive force between the driving magnet 521a and the pulling yoke 225, the driving portion 520 may be in close contact with the fixed portion 510, for example, the protruding portion 516. Moreover, in an example, in addition to the pulling yoke 225, to prevent the ball bearings 571 and 573 from being separated, the protruding bump 516c of the fixed portion 510 and the locking projection 522c of the driving portion 520 caught by an inner side of the protruding bump 516c may be provided. Thus, in an example, a structure, in which the driving portion 520 is able to be tightly coupled to the protruding portion 516, may be doubly provided.

Here, in an example, as disclosed in FIG. 10B, a structure in which tight coupling of the driving portion 520 and the protruding portion 516 is implemented by the protruding bump 516c of the fixed portion 510 and the locking projection 522c of the driving portion 520 caught by an inner side of the protruding bump 516c is also included. In this case, a pulling yoke 225 may not be provided.

Furthermore, in an example, as disclosed in FIG. 10O, a structure, in which tight coupling of the driving portion 520 and the protruding portion 516 is only implemented by the attractive force between the driving magnet 521a and the pulling yoke 225, is also included. In this case, a protruding bump 516c and a locking projection 522c may not be provided.

Figure 11A:
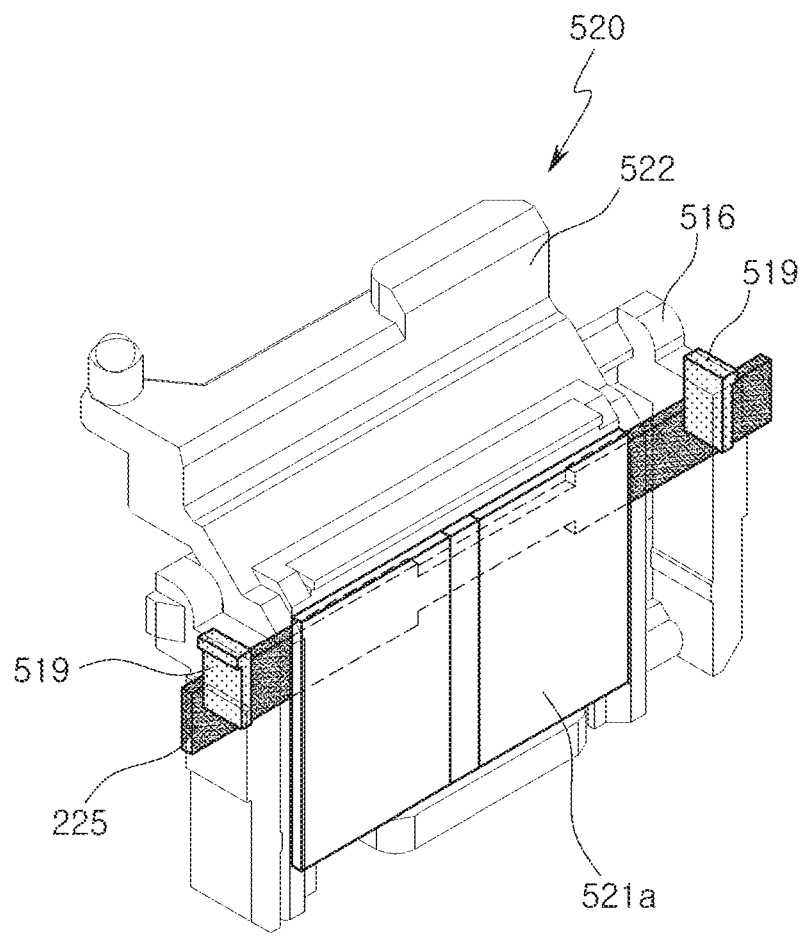
FIG. 11A is a view illustrating an example of a locational relationship of a driving magnet, a pulling yoke, and a holding yoke.
Figure 11B:
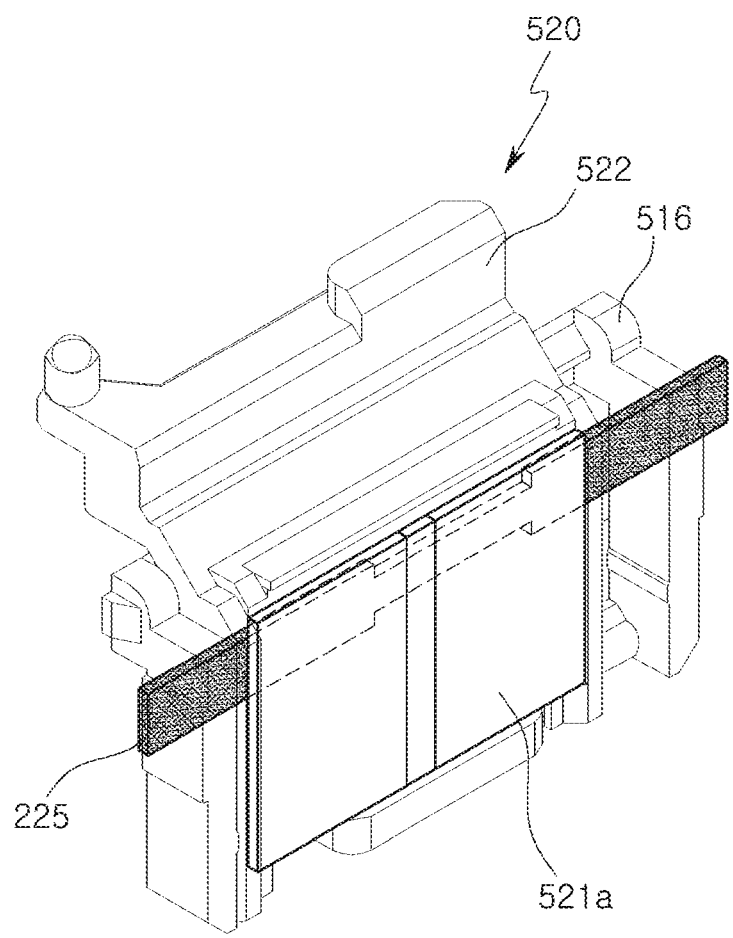
FIG. 11B is a view illustrating an example of a locational relationship of a driving magnet and a pulling yoke.
Figure 11C:
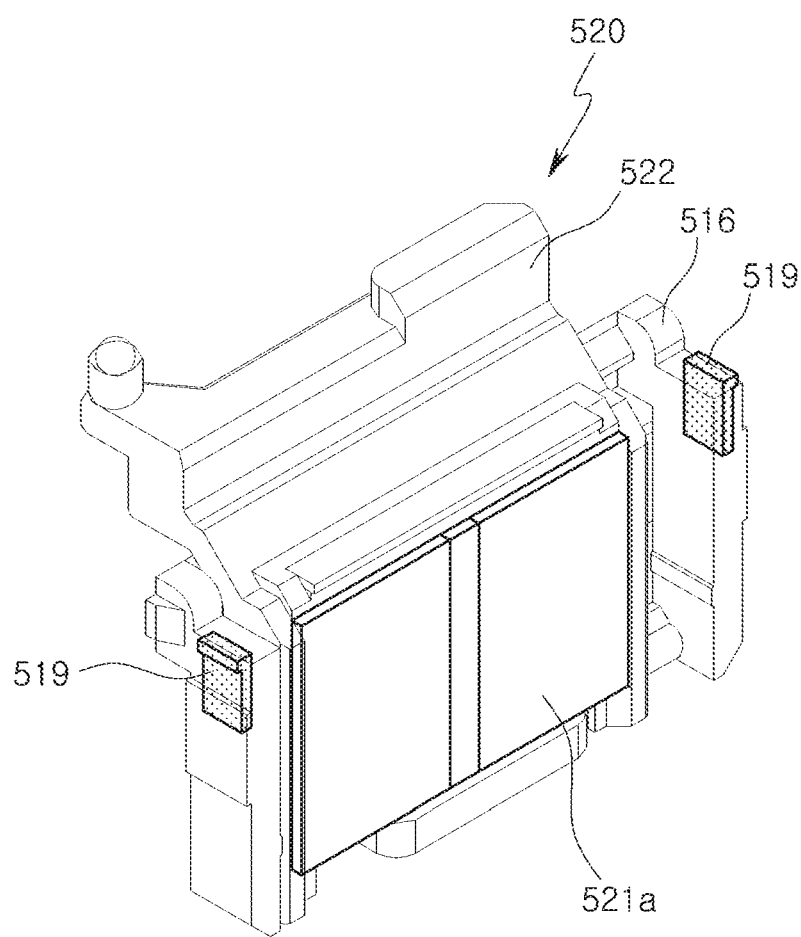
FIG. 11C is a view illustrating an example of a locational relationship of a driving magnet and a holding yoke.

FIG. 11A is a view illustrating an example of the locational relationship of a driving magnet, a pulling yoke, and a holding yoke, FIG. 11B is a view illustrating an example of the locational relationship of a driving magnet and a pulling yoke, and FIG. 11C is a view illustrating an example of the locational relationship of a driving magnet and a holding yoke.

As described previously, according to an example illustrated in FIG. 11A, due to the attractive force between the driving magnet 521a and the pulling yoke 225 as well as the protruding bump 516c of the fixed portion 510 and the locking projection 522c of the driving portion 520 caught by an inner side of the protruding bump 516c, the driving portion 520 may be doubly held in close contact with the fixed portion 510, for example, the protruding portion 516.

Moreover, in an example, as illustrated in FIG. 11A, the pulling yoke 225 is formed to have a length greater than a length of the driving magnet 521a in a direction of movement of the driving portion 520, and both ends of the pulling yoke 225 are provided to have an area larger than an area of a middle portion thereof. In addition, the protruding portion 516 may be provided with a holding yoke 519 at both ends of the driving magnet 521a in the direction of movement of the driving portion 520. Thus, a structure in which the driving portion 520 moves to a left or right side and is then fixed may be doubly provided by the pulling yoke 225 and the holding yoke 519.

Here, in an example, as disclosed in FIG. 11B, a structure, in which the driving portion 520 moves to a left or right side and is then fixed, may be implemented by the pulling yoke 225. In this case, a holding yoke 519 may not be provided.

Moreover, in an example, as disclosed in FIG. 11C, a structure, in which the driving portion 520 moves to a left or right side and is then fixed, may be implemented by the holding yoke 519. In this case, the pulling yoke 225 may not be provided. Alternatively, even when the pulling yoke 225 is provided, the pulling yoke 225 may mainly serve to allow the driving portion 520 to be in close contact with the protruding portion 516 by the attractive force with the driving magnet 521*a*.

Through the examples described herein, a camera module may selectively change an amount of light incident through an aperture module, prevent a level of an autofocusing function from being degraded even when an aperture module is mounted on a lens module, and significantly reduce an increase in weight on the lens module applied by the aperture module.

As set forth in the examples described herein, a camera module may significantly reduce an increase in weight of a driving portion even when an aperture module is mounted on a lens module and may optimize the placement of components, thereby maintaining autofocusing and optical image stabilization functions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
a housing accommodating a lens module; and
an aperture module coupled to an upper portion of the lens module, the aperture module comprising a plurality of plates configured to change an amount of light incident on the lens module,
wherein at least one of the plurality of plates is configured to be driven by an interaction between a driving magnet disposed in the aperture module and a driving coil disposed on the housing opposing the driving magnet in a first direction substantially perpendicular to an optical axis direction.

2. The camera module of claim 1, wherein the aperture module further comprises:
a fixed portion comprising a base fixed to an upper portion of the lens module, and a protruding portion extended in the optical axis direction along an outer side of the lens module from the base; and
a driving portion configured to be moved from the protruding portion in a second direction perpendicular to the optical axis direction.

3. The camera module of claim 2, wherein the driving magnet is disposed in the driving portion.

4. The camera module of claim 3, further comprising a pulling yoke disposed on a portion of an outer side surface of the lens module opposing the driving magnet in the first direction substantially perpendicular to the optical axis direction.

5. The camera module of claim 4, wherein the pulling yoke comprises a length greater than a length of the driving magnet in the second direction, and wherein the pulling yoke comprises a middle portion and ends, which each comprise an area greater than an area of the middle portion.

6. The camera module of claim 3, further comprising a holding yoke disposed in each end of the protruding portion in the second direction.

7. The camera module of claim 2, further comprising at least one ball bearing disposed between the fixed portion and the driving portion.

8. The camera module of claim 7, wherein the at least one ball bearing comprises two or more ball bearings and at least two of the ball bearings are spaced apart from each other in the optical axis direction and disposed in each of at least two portions, upwardly and downwardly.

9. The camera module of claim 7, wherein a lower end of the protruding portion comprises a protruding bump protruding upwardly in the optical axis direction, and
wherein a lower end of the driving portion comprises a locking projection protruding downwardly in the optical axis direction to be caught by an inner side of the protruding bump.

10. The camera module of claim 9, wherein the protruding bump and the locking projection extend in the second direction.

11. The camera module of claim 1, wherein the aperture module comprises a cover coupled to an upper portion, and
wherein an additional plate, fixedly coupled to the aperture module, is disposed between the plurality of plates and the cover.

12. The camera module of claim 11, wherein the additional plate comprises a passing hole, through which light passes, and
wherein the passing hole has a diameter smaller than a relatively large diameter of a first hole formed by overlapping the plurality of plates in a first arrangement, and has a diameter larger than a relatively small diameter of a second hole formed by overlapping the plurality of plates in a second arrangement.

13. The camera module of claim 11, wherein the additional plate is provided in the form of a plate and is antistatic treated.

14. The camera module of claim 2, wherein the base comprises a first projecting portion protruding in an optical axis direction,
wherein the at least one of the plurality of plates is fitted to the first projecting portion to be rotated around the first projecting portion as a shaft,
wherein the driving portion comprises a second projecting portion protruding in the optical axis direction, and
wherein the second projecting portion is disposed in a guide hole having a hole shape elongated in a direction in the at least one of the plurality of plates.

15. The camera module of claim 14, wherein the guide hole comprises a first guide hole and a second guide hole disposed in respective plates of the at least one of the plurality of plates, wherein the elongated direction is inclined in the second direction, and
wherein the first guide hole and the second guide hole are inclined with respect to each other.

16. A camera module, comprising:
a lens module disposed in a housing; and
an aperture module, comprising:
a fixed portion disposed on the lens module comprising a protruding portion extended in a first direction, a driving magnet, disposed on the protruding portion, and configured to move from the protruding portion in a second direction substantially perpendicular to the first direction, a driving coil disposed on the housing and configured to move the driving magnet, and plates disposed on the fixed portion and coupled to the driving magnet, wherein through holes in each of the plates overlap to form an incident hole and change a diameter of the incident hole based on movement of the driving magnet.

17. The camera module of claim 16, wherein the plates comprise a first plate and a second plate disposed on a first projecting portion of the fixed portion that are configured to rotate in opposite directions from each other around the first projecting portion as a shaft by movement of the driving magnet to a first end portion of the protruding portion in the second direction and to counter-rotate around the first projecting portion as a shaft by movement of the driving magnet to a second end portion of the protruding portion in the second direction, wherein the first plate and the second plate each form a portion of an edge of the incident hole comprising a first diameter by the driving magnet being at the first end portion of the protruding portion and the first plate and the second plate each form a portion of an edge of the incident hole comprising a second diameter greater than the first diameter by the driving magnet being at the second end portion of the protruding portion.

18. The camera module of claim 17, wherein the aperture module further comprises an additional plate, disposed above the aperture module, and comprising a passing hole comprising a third diameter greater than the first diameter and less than the second diameter through which light passes to the incident hole.

\* \* \* \* \*